Figure 4:
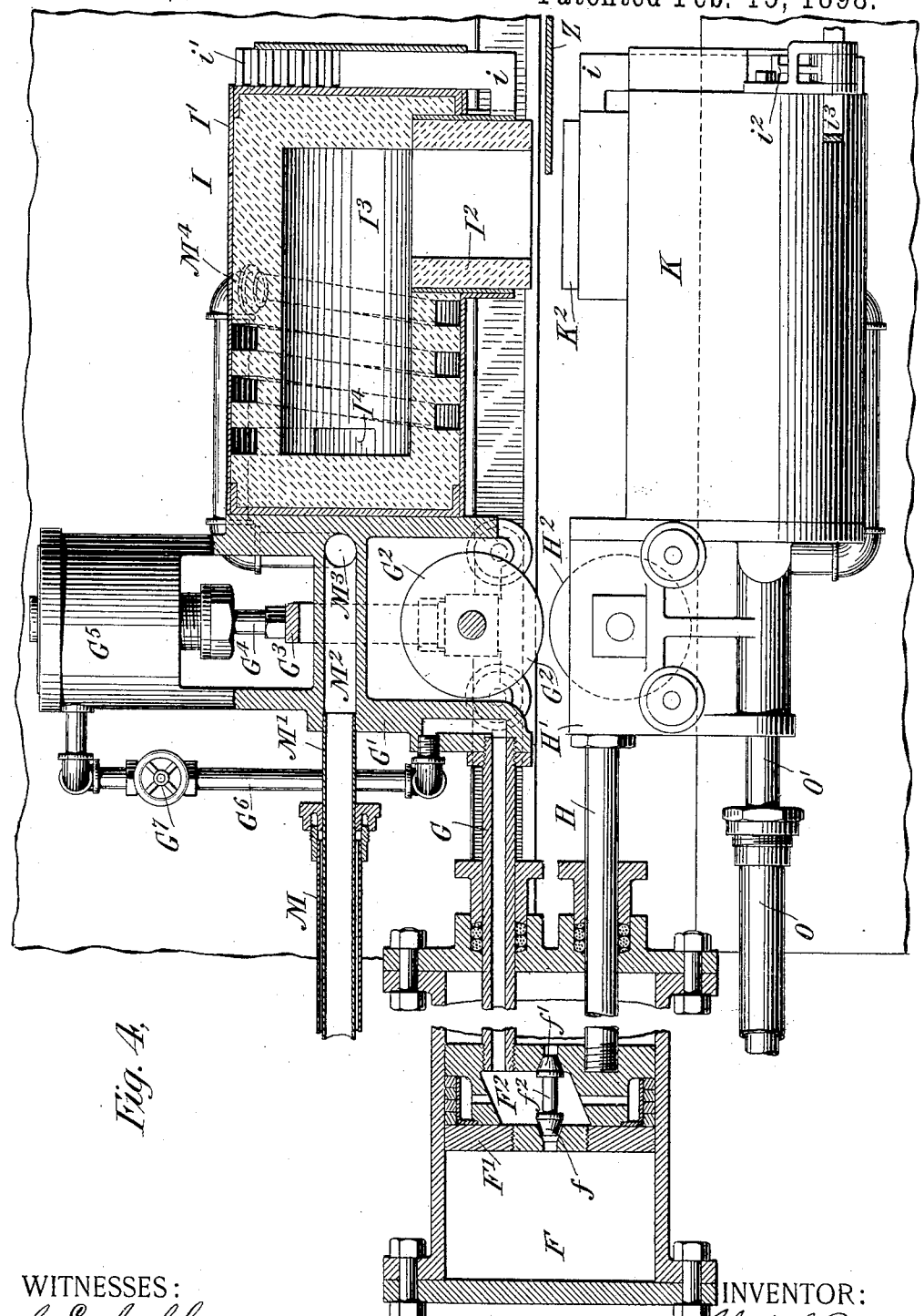

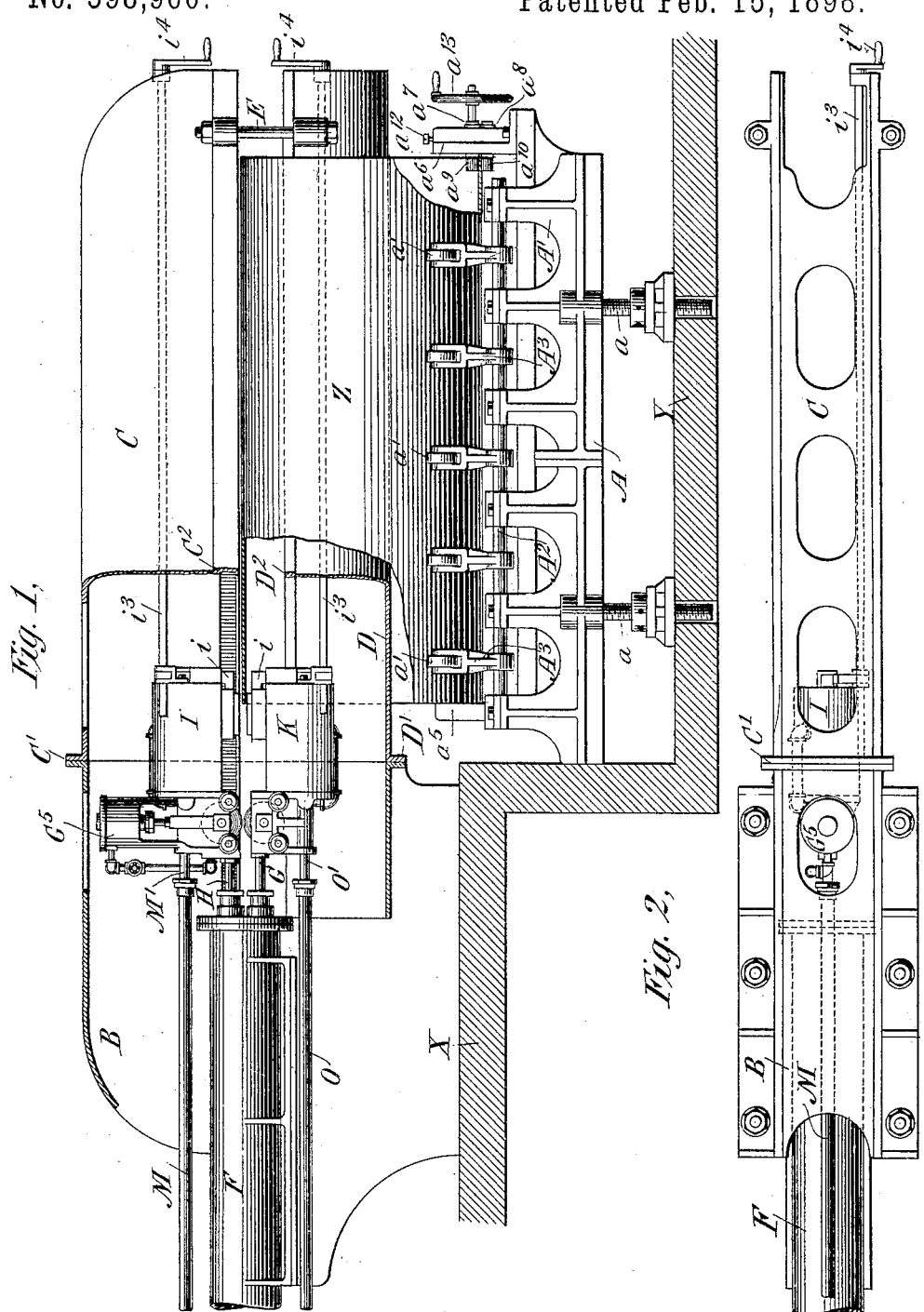

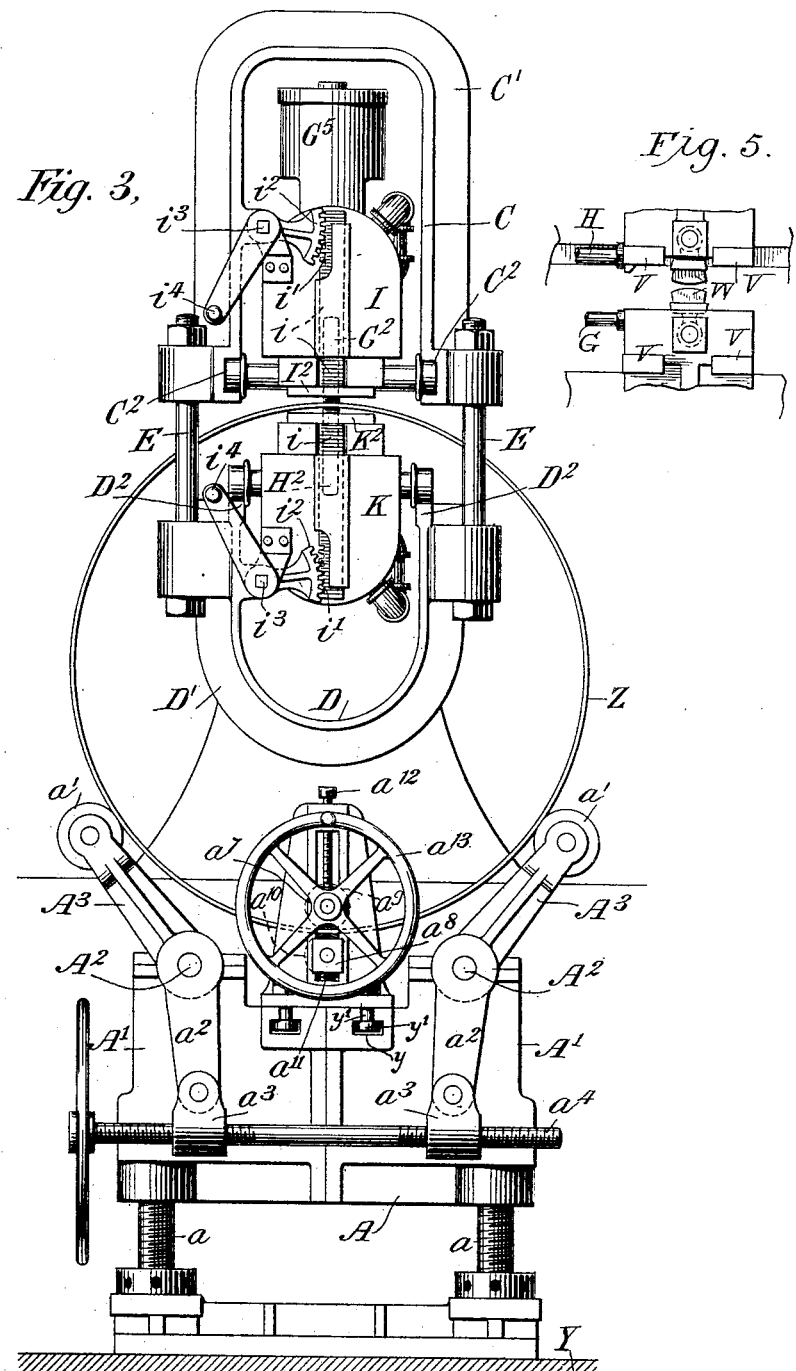

(No Model.) 3 Sheets—Sheet 3.

C. L. ROWLAND.
WELDING APPARATUS.

No. 598,960. Patented Feb. 15, 1898.

WITNESSES:
C. E. Ashley
H. W. Lloyd.

INVENTOR:
Charles L. Rowland
By his Attorneys
Baldwin, Davidson & Wight

UNITED STATES PATENT OFFICE.

CHARLES L. ROWLAND, OF BROOKLYN, NEW YORK.

WELDING APPARATUS.

SPECIFICATION forming part of Letters Patent No. 598,960, dated February 15, 1898.

Application filed May 13, 1895. Serial No. 549,182. (No model.)

*To all whom it may concern:*

Be it known that I, CHARLES L. ROWLAND, a citizen of the United States, residing at Brooklyn, in the county of Kings and State of New York, have invented certain new and useful Improvements in Welding Apparatus, of which the following is a specification.

My invention relates to apparatus for welding the joints or seams of plates or cylinders or other articles or structures, and to the class of apparatus in which the seam or joint to be welded is heated between oppositely-facing furnaces (which are usually gas-furnaces) to the proper temperature, after which the seam is subjected to the welding operation.

Apparatus of this general character have heretofore been patented—for instance, in the patent of Bertram, No. 15,159, dated June 17, 1856; Cooke, No. 27,619, dated April 3, 1860, and Root, No. 346,828, as well as others. For instance, a cylinder, the seam of which is to be welded, is mounted in a horizontally-movable carriage, the seam or joint heated by horizontally-moving facing-furnaces, and the carriage then moved to bring a stationary anvil within the cylinder and against the under side of the seam, the welding being accomplished by hammering, as shown in the patent of Rowland, Hill, and McLachlan, No. 384,081. In a patent to the same patentees, No. 384,082, substantially the same arrangement is shown, except that the cylinder in a horizontally-movable carriage is forced between welding-rolls mounted in suitable juxtaposition in the free ends of two elongated jaws or beams. It is therefore old to move a cylinder after the lap or seam has been heated up to an anvil for hammer-welding or between rolls for roller-welding.

In the patent of T. F. Rowland, No. 412,122, a modified arrangement of the organizations above referred to is shown, the modifications consisting in placing the welding-rolls in the upper free ends of two vertical arms and mounting the cylinder upon a vertically-moving carriage mounted upon and traveling on one of said arms.

In the patent of T. F. Rowland, Jr., No. 486,009, is shown an arrangement substantially identical with that shown in the last-named patent with additional modifications, however, providing for an adjustment of the vertically-carried cylinder in a horizontal plane to bring the lap or seam into proper position with reference to the two welding-rolls and a circumferential adjustment of the vertically-carried cylinder to vary the relation of the cylinder-seam to the welding-rolls.

The patent of Cartwright, No. 400,829, shows a machine for welding pipes having two parallel jaws or frames, between which two oppositely-arranged welding-rolls and furnaces are reciprocated in a short path by a crank and pitman. The cylinder to be welded is suspended from a suitable point and is fed between the welding devices with the seam in suitable relation thereto.

In my Patent No. 519,776, dated May 15, 1894, I show an arrangement in which the cylinder is mounted in a stationary cradle, the seam heated by horizontally-movable facing-furnaces, and an anvil moved horizontally to enter the cylinder and bear against the under side of the seam, the welding being accomplished by hammering.

In my present invention I mount the cylinder or other article being operated upon on a stationary cradle or support, heat the seam by facing-furnaces moving along it, and weld the seam by traveling welding-rolls or pressure-shoes.

My improved apparatus may be arranged to operate either horizontally or vertically. In the organization hereinafter described I provide two opposite beams or frames, preferably U-shaped in cross-section, place the cylinder with the lap or seam to be welded between such opposed frames and form each frame so that it will afford a track or way for a truck or sliding carriage, one truck for each frame. Such trucks carry the welding rolls or devices and may also carry the heating-furnaces, or the furnaces may be supported and manipulated as described in my Patent No. 519,776 or otherwise. These trucks are moved forward and back upon their tracks, as required, by any suitable means, and preferably by piston-rods connected with a piston traveling in a power-cylinder and adapted to be operated by water, steam, or air. The required pressure of the welding devices may be obtained by a pressure-cylinder whose piston-rod is connected with a movable block, in which one of the rolls or shoes is mounted, as hereinafter described. The cylinder or work being operated upon may be adjusted transversely to the line of travel of the furnaces and welding devices by the manipulation of the cradle mechanism, and the cylinder may also be adjusted circumferentially to vary the relation of the lap or seam to the welding devices. Such are generally some of the features of the improved organization hereinafter described, but others, as well as the details of construction of my apparatus and the operation thereof, are set forth in the following description.

I am aware, however, that it is not new to provide two parallel frames between which the side of the cylinder having the seam to be welded is placed and held to be acted upon by opposite welding devices, the lower one of which is held up to its work by the lower frame and the upper one of which is held to its work by the upper frame, and both of which may be reciprocated throughout the length of the seam by piston-rods connected with the piston traveling in a power-cylinder, such an organization being disclosed in the patent of Strong, No. 324,610.

My improved organization, hereinafter described and claimed, differs, however, from the organization of the Strong patent in certain features of construction and operation, as will hereinafter appear.

The accompanying drawings illustrate my invention in a practical and efficient form and as embodied in the best way now known to me; but obviously variations of details may be made without departing from the spirit of my invention.

Figure 1 is a side elevation partly broken away; Fig. 2, a plan view; Fig. 3, an end elevation; Fig. 4, a view on a larger scale, partly in side elevation and partly in section, showing more especially the furnaces, the trucks and welding-rolls, means for operating the trucks, and means for imparting the desired pressure to one of the welding-rolls; and Fig. 5, a detail view showing the welding-shoes that may take the place of the rolls.

In the drawings the apparatus is indicated as arranged to operate horizontally and will therefore be so described. The line X may indicate an elevation above the floor-level of the shop, and Y the floor-level on which the base A of the cradle is supported by four vertical adjusting screw-posts $a$ $a$. The frame A' of the cradle has mounted in each side thereof a rock-shaft $A^2$, and on such shaft, at suitable intervals, are keyed arms $A^3$, carrying at their outer ends rolls $a'$, upon which the cylinder Z rests. At the front end of the cradle these rock-shafts have downwardly-projecting arms $a^2$ keyed to them, and to the ends of these arms are attached screw-threaded lugs $a^3$, the lugs being reversely threaded with reference to each other and respectively engaged by corresponding threads on a screw-shaft $a^4$, provided with a suitable hand-wheel. By the manipulation of the hand-wheel the arms $a^2$ may be moved toward or from each other, thus producing complementary movement of the arms $A^3$, adapting the rollers thereon to support cylinders of various sizes and permitting of the desired vertical adjustment of the cylinder. At the rear end of the cradle is a stop or bracket $a^5$, against which the rear edge of the cylinder may abut, and at the front end of the cradle is a similar stop $a^6$, against which the front edge of the cylinder may abut. The front bracket has mounted in it bearing-blocks $a^7$ $a^8$, carrying short horizontal shafts having upon their inner ends clamping-rolls $a^9$ $a^{10}$. Both of these blocks are vertically adjustable, the lower one by a screw-post $a^{11}$ and the upper one by a screw-rod $a^{12}$, and the shaft mounted in one of the blocks—the upper one, as shown in the drawings—is provided with a hand-wheel $a^{13}$. It will be seen that by a proper adjustment of the block the rolls $a^9$ $a^{10}$ may be adjusted vertically to clamp between them the wall of the cylinder at its forward edge, and by the manipulation of the hand-wheel the upper roll $a^9$ may be rotated to produce a circumferential adjustment of the cylinder, for a purpose hereinafter described. Thus all the desired adjustments of the otherwise stationary cylinder are provided for, and when the seam of the cylinder is being acted upon by the welding-rolls, as hereinafter described, the edge of the cylinder abuts against either the rear bracket $a^5$ or the forward bracket $a^6$, as the case may be, and is held positively to the work of the rolls.

On the floor X, or a suitable base attached thereto, is mounted a hollow arched iron main frame B. A projecting frame C, preferably U-shaped in cross-section, may be attached by means of flanges C' to the main frame B or be otherwise supported. This frame C is preferably of metal and is of suitable strength and rigidity, and within and near its edges is provided a track $C^2$, which may be formed, as shown, by recesses in the opposite wall of the frame. Another frame D, of similar shape arranged opposite the frame C and parallel therewith, may be attached to the main frame B by a flanged connection D', as shown. The frame B is also provided with a track $D^2$, that may be formed by the edges of the U-shaped frame, as shown in the drawings. At or near their outer ends these two frames are on each side rigidly bolted together by bolts E. Such bolts are of course removed for the insertion of the cylinder Z between the frames, as indicated in Figs. 1 and 3, and are then replaced, the purpose of the bolts being to tie the frames together and prevent them from springing apart during the welding operation hereinafter described. However, if the frames are of sufficient strength or if they are supported from their outer sides against the strain of the welding-roll the bolts E may of course be dispensed with.

Within the main frame B is suitably mounted a double-acting power-cylinder F, to which water, air, or steam is admitted in any ordinary and well-known way, (not shown,) and to the piston F' of which are attached two piston-rods G and H, that pass through suitable stuffing-boxes in the head of the cylinder, as clearly indicated in Figs. 1 and 4. The piston-rod G is attached to a truck G', running upon the track $C^2$ in the upper frame C, while the piston-rod H is attached to a similar truck H', running upon the track $D^2$ in or on the lower frame D. These trucks are arranged opposite each other and respectively carry in suitable bearings the welding-rolls $G^2 H^2$. The bearings of the welding-roll $G^2$ are mounted in suitable blocks adjustable in the truck in a line at right angles to the axis of the piston-rod G, which adjustment may be accomplished as follows: An inverted-U-shaped yoke $G^3$ straddles the truck G', and its ends are respectively connected with the bearing-blocks of the welding-roll $G^2$. A piston-rod $G^4$ is connected with the arch of the yoke and also to a piston working in a cylinder $G^5$, which may be supplied with a source of power of any desired character—as, for instance, water, steam, or air under pressure—to force the welding-roll $G^2$ down upon the seam or lap of the cylinder or other article being operated upon, as will hereinafter be described. The drawings only show such an adjustment of the welding-roll $G^2$, but obviously the welding-roll $H^2$ may be acted upon in an identical manner. In the drawings the cylinder $G^5$ is supplied with power in the following manner: The piston-rod G is tubular, and the end attached to the truck G' communicates with a passage in the wall of the truck, which passage is connected by a pipe $G^6$, having therein a suitable controlling-valve $G^7$ with the cylinder $G^5$. The opposite end of the piston-rod G is, as stated, attached to the piston F' of the power-cylinder F and communicates with a chamber $F^2$ in the interior of the piston-head. The opposite walls of this chamber have apertures communicating with the interior of the cylinder on opposite sides, respectively, of the piston-head, and these apertures are formed with valve-seats, against which work valves $f f'$ on a loose or shuttle valve-stem $f^2$. It is maintained in the piston transversely across the cylinder by the entrance of the valves within their respective seats. The valve-stem $f^2$ has sufficient endwise play to close one of the valves against its seat and open the other. Thus it will be seen that there will always be a communication between the power side of the piston-head and chamber $F^2$, and consequently through G and $G^6$ to the cylinder $G^5$. Of course if it were desired to similarly control the welding-roll $H^2$ it would only be necessary to make the piston-rod H hollow and duplicate the construction just described.

The heating-furnaces I K, respectively carried by the trucks G' H', extend forward in front of the welding-rolls. These furnaces are attached to the trucks, as shown, or in any suitable manner, and may be composed, as usual, of a structure of fire-brick inclosed by a jacket or casing of sheet-iron I'. The burner-mouths $I^2 K^2$ constitute right-angular extensions of an interior combustion-chamber $I^3$. The gaseous fuel is admitted at $I^4$.

As described in my prior patent hereinbefore referred to, air and gas mixed in suitable proportions may be forced by a mixing-blower under proper pressure to the furnaces I K, and, as shown in that patent, the pipes for conveying the mixed air and gas to the respective furnaces or to some part of the apparatus moving therewith may be flexible to permit of the desired amount of movement. In the present organization, however, I have shown another arrangement, which is substantially as follows: The pipe connection from the mixed air and gas blower (not shown) is connected at L to a pipe L', mounted upon the power-cylinder, and from the respective ends of which extend two pipes or small long cylinders M O parallel with the axis of the cylinder. Smaller pipes M' O' slide within the pipe-cylinders M O through suitable stuffing-boxes, the two pipes in each case forming a telescoping connection, and the opposite ends of the pipes M' O' are respectively connected with the bodies of the trucks G' H' and open into passages formed within the body of the truck, as shown at $M^2$, Fig. 4. From the opposite end of this passage a pipe $M^3$ extends to the furnace and through the wall thereof at $M^4$ and opens into an annular spiral flue formed in the fire-brick and running around the combustion-chamber $I^3$ several times, which flue finally enters the combustion-chamber at $I^4$. The combined air and gas fuel is ignited within the combustion-chamber $I^3$ and burns therein, thus highly heating the surrounding body of the furnace and the incoming gaseous fuel passing through the flue between $M^4$ and $I^4$ before it reaches the combustion-chamber. The fuel is thus burned to the best advantage and a high temperature given to the products of combustion issuing from the burner-mouths $I^2 K^2$ and impinging against opposite sides of the lap or seam to be welded.

The operation of the apparatus as thus far described is as follows: The cylinder Z having been mounted in proper relation to the welding apparatus, as shown in Fig. 1, the gaseous fuel is lighted in the furnaces I K, between which the lap or seam of the cylinder lies, and the trucks G' H' are slightly advanced (in the manner described or otherwise) to bring the furnace-mouths in proper relation to the seam. When the cylinder lap or seam is raised to the proper temperature by the oppositely-directed impinging flames, the trucks are advanced to bring the welding-rolls into action upon the heated part of the seam, the proper pressure of the welding-rolls being obtained in the manner described or otherwise. The welding-rolls may be then caused to travel back upon the heated part of the seam until a proper weld is effected, and of course the pressure of the rolls upon the seam may be varied or increased during their action upon this section or length of the seam. The operation is continued until the entire seam has been properly welded.

It may be desirable to adjust the cylinder circumferentially, so that the welding-rolls at one time work directly upon one edge forming the lap and at another time upon the other edge as well as intermediate such edges, and such adjustment of the cylinder may be accomplished by the rolls $a^9$ $a^{10}$, as already described.

In a machine of the general construction described it will be desirable to adjust the furnaces or their burner-mouths to adapt them to be set in proper relation to the sides of cylinders of different diameters and to compensate for wear, due to the rubbing of the furnace-mouths against the object being operated upon. This may be accomplished in various ways. In the drawings the burner-mouths $I^2$ are made to slide in the body of their respective furnaces and each is connected to an arm $i$, extending across the end of the furnace, and having a rack $i'$ formed thereon that is engaged by a toothed quadrant $i^2$, keyed on a rock-shaft $i^3$, mounted on the frame and extending to the free end thereof, where it is provided with a hand-wheel or a crank $i^4$, all as clearly shown in the drawings.

Instead of welding-rolls other automatic welding mechanism or devices may be employed. For instance, in Fig. 5 I have shown that the trucks may slide in the frames instead of being carried by wheels, and V indicates sliding blocks upon which the trucks are mounted. As here indicated, the welding-wheels may be replaced by shoes W, that produce the weld by a squeezing and rubbing action as they are caused to traverse back and forth along the seam. Otherwise the construction may be as illustrated in the other figures.

It is apparent that my improved welding apparatus may be employed in connection with any means of heating the seam.

The bracket $a^6$ may be slid or adjusted on the cradle-frame or removed therefrom. The construction permitting this is shown at Fig. 3, where are shown longitudinal recesses $y$ in the cradle-frame. The heads of the bolts $y'$, that secure the bracket, lie in these recesses and the shanks pass through the narrower slot $y^2$ into the feet or base of the bracket.

I claim as my invention—

1. In a welding apparatus, the combination of parallel frames, each provided or formed with a track or way, a truck traveling upon each track or way, a welding device mounted in each truck, a heating-furnace carried by each truck, the welding device and furnace of one truck being arranged facing or opposite the welding device and furnace of the other truck, mechanism for moving the trucks back and forth along their tracks, or ways, and a cradle arranged beneath the frames for supporting a cylinder whose seam is to be welded, and having mechanism for adjusting the cylinder vertically, and front and back stops to sustain it against endwise movement.

2. In a welding apparatus, the combination of parallel frames, each provided or formed with a track or way, a truck traveling upon each track or way, a welding device mounted in each truck, a heating-furnace carried by each truck, the welding device and the mouth of the heating-furnace carried by one truck being respectively arranged opposite the welding-roll and furnace of the other truck, a power-cylinder mounted on one of the trucks, operative connections between such cylinder and the welding device of said truck, whereby the said welding device may be held to its work, mechanism for moving the trucks back and forth upon their ways, a cradle arranged below the parallel frames for supporting the cylinder to be welded, and having mechanism for adjusting the cylinder vertically to bring the seam to be welded into the proper plane, mechanism for adjusting the cylinder circumferentially to vary the relation of the seam to the welding devices transversely, and front and back stops for sustaining the cylinder against endwise movement.

3. In a welding apparatus, the combination of parallel facing-tracks, a truck traveling upon each track, a welding device mounted in each truck, a power-cylinder, its piston, a connection between each truck and the piston, a piston-rod connected with the boxes or bearings of one of the welding devices, its cylinder $G^5$, a communication between such cylinder and a chamber within the piston of the power-cylinder, valve mechanism by means of which the cylinder $G^5$ is maintained in communication with the power-cylinder on the inlet side, irrespective of the direction of movement of its piston, mechanism for supporting the article to be welded with the seam thereof in proper relation to the welding devices, and means for heating the seam to a welding temperature.

4. In a welding apparatus, the combination of facing-furnaces moving back and forth upon suitable supports or frames in fixed parallel lines, one of said furnaces, viz: that adapted to move inside of a cylinder to be welded, having a sliding or movable burner-mouth, mechanism whereby the burner-mouth may be moved in and out to suitably adjust it to cylinders of various sizes, and mechanism for supporting the cylinder to be welded in proper relation to the facing-furnaces.

5. The combination of two facing-furnaces movable back and forth in fixed right lines upon suitable supports, mechanism whereby the distance between the burners of the two furnaces may be varied, and mechanism for supporting the cylinder or object to be welded with the seam between the movable furnaces.

6. In a welding apparatus, the combination of facing-furnaces adapted to travel back and forth in parallel lines upon suitable supports or frames, one of said furnaces having a sliding or movable burner-mouth, and mechanism for moving the mouth in and out to adjust it in proper relation to the article being welded.

7. In a welding apparatus, the combination with traveling heating and welding devices, of a cradle for supporting the cylinder whose seam is to be welded, said cradle having front and back stops for holding the cylinder against endwise movement, and mechanism for partially rotating the cylinder to adjust the seam transversely, substantially as set forth.

8. In a welding apparatus, the combination with traveling heating and welding devices, of a cradle for supporting the cylinder whose seam is to be welded, said cradle having front and back stops for holding the cylinder against endwise movement, mechanism for partially rotating the cylinder to adjust the seam transversely, and mechanism for adjusting the cylinder vertically, substantially as set forth.

9. In a welding apparatus, the combination with means for heating and welding the seam of a cylinder, of a cradle for supporting the cylinder, and rolls for gripping the edge of the cylinder and effecting its circumferential adjustment.

10. In a welding apparatus, the combination with furnaces, welding devices, and mechanism for moving them back and forth, of a cylinder-supporting cradle adapted to support the seam to be welded in proper relation to the heating and welding devices and having front and back stops and rolls that grip the edge of the cylinder and effect its circumferential adjustment.

11. The combination of the power-cylinder, its chambered piston-head, the opposite walls of which are apertured and provided with valve-seats, an endwise-movable valve-stem having a valve for each seat, and a hollow rod connected with the piston-head and leading from the chamber thereof, substantially as set forth.

12. The combination of a cylinder F, its chambered piston-head, a hollow rod leading therefrom, and valve mechanism by which the chamber in the piston-head is maintained in communication with the inlet end of the cylinder when the piston-head is moving in either direction, substantially as set forth.

13. In a welding apparatus, the combination of stationary parallel frames, opposed welding devices located between the two frames and respectively mounted in or running upon the frames, opposed heating-furnaces also located between the two frames, a stationary support for the cylinder located opposite the frames and adapted to support the cylinder with the seam to be welded between and in proper relation to the heating-furnaces and welding devices, and having means for adjusting the cylinder to present its seam in proper relations to the welding devices and furnaces, and mechanism for reciprocating the welding devices and furnaces throughout the length of the seam to be welded, substantially as set forth.

14. In a welding apparatus, the combination of stationary parallel frames, welding and heating devices adapted to reciprocate between the frames, a stationary-cylinder support having mechanism for adjusting the cylinder and supporting it in proper relation to the heating and welding devices, and mechanism for reciprocating the heating and welding devices throughout the length of the seam to be welded, substantially as set forth.

In testimony whereof I have hereunto subscribed my name.

CHARLES L. ROWLAND.

Witnesses:
FRANK S. OBER,
EDWARD C. DAVIDSON.